Jan. 24, 1939.  W. G. CLARK  2,144,618
ORE REDUCTION PROCESS
Filed Jan. 11, 1936  2 Sheets-Sheet 1
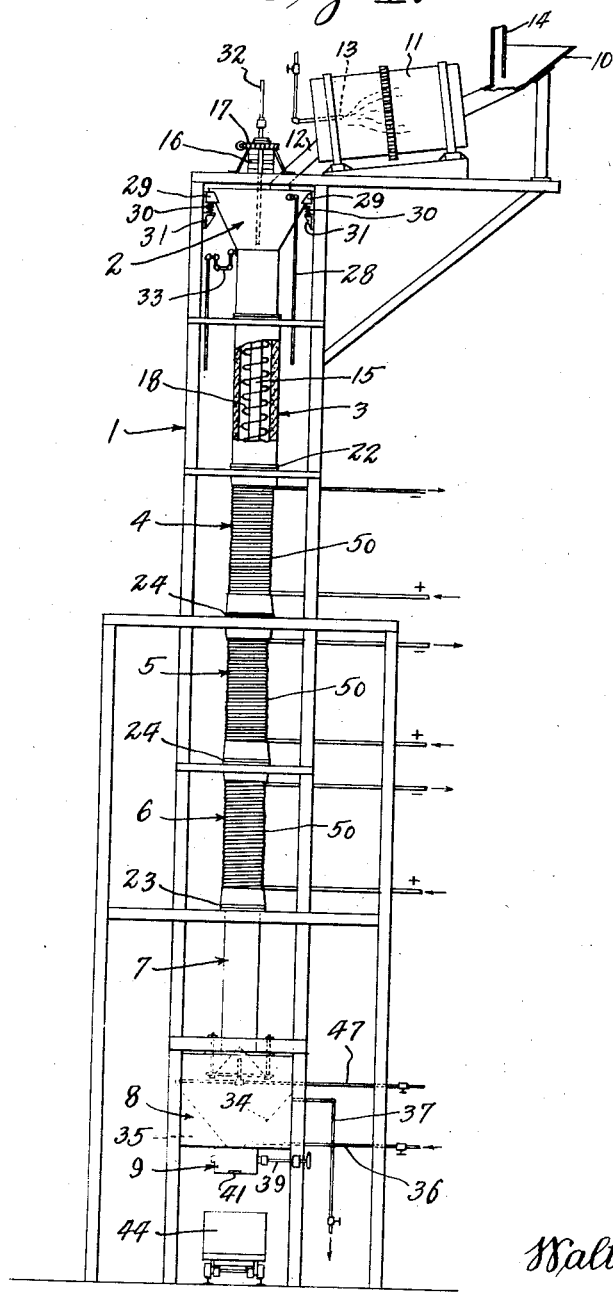
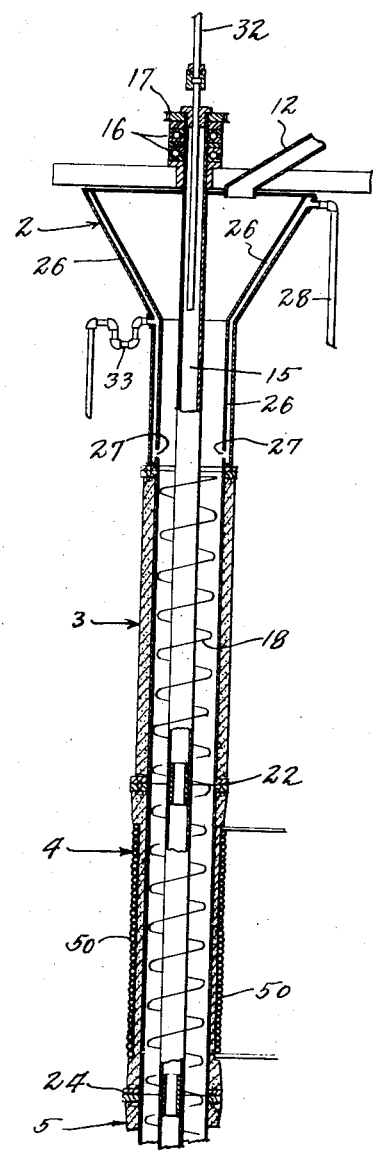
INVENTOR.
Walter Gordon Clark
BY Lyon & Lyon
ATTORNEYS

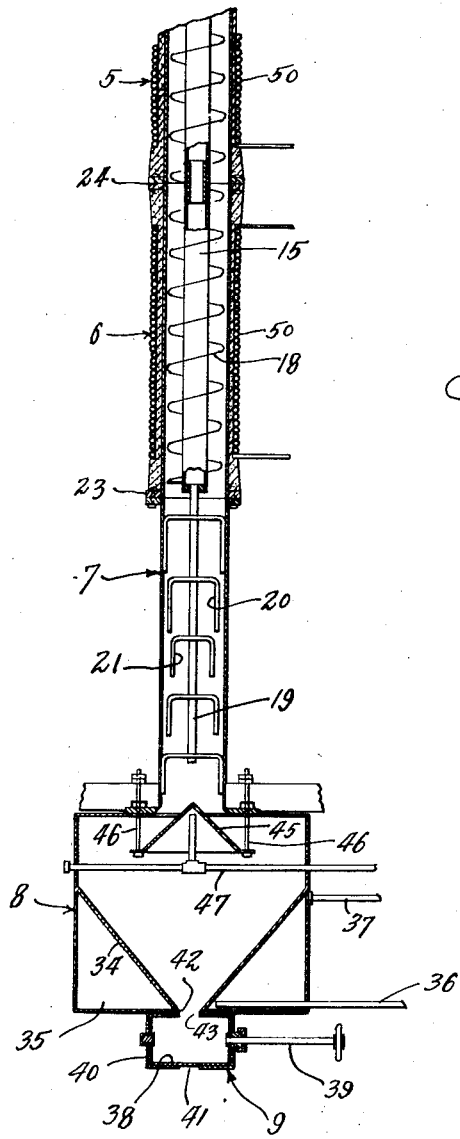

Patented Jan. 24, 1939

2,144,618

UNITED STATES PATENT OFFICE 2,144,618

ORE REDUCTION PROCESS

Walter Gordon Clark, Los Angeles, Calif., assignor, by direct and mesne assignments, to Clark-iron, Inc., Los Angeles, Calif., a corporation of Nevada Application January 11, 1936, Serial No. 58,685

6 Claims. (Cl. 13—26)

This invention relates to a continuous method of reducing ores, in which method a reducing gas is employed. The invention particularly relates to the reduction of metallic ores in relatively finely divided form, which can not be ordinarily successfully reduced by existing methods. Various ores may be treated in accordance with this process, iron, chrome, nickel, vanadium and titanium ores being illustrative of types which can and have been successfully treated.

The reduction of ores or concentrates to metallic form in a continuous manner has been attempted heretofore but such attempts have proved unsuccessful for a number of reasons. In the reduction of ores such as the metallic oxide ores, attempts have been made to pass heated gases upwardly through a kiln or furnace continuously supplied with fresh ore at the top, the reduced ore being removed from the bottom. Such operation has not been successful because during reduction the particles of ore become sticky and adhere to the walls of the furnace and to each other, bridging the furnace and thereby preventing continuous or any downward movement of the ore. After a furnace has been plugged up in this manner, the only remaining alternative requires termination of the operation, followed by a lengthy and expensive cleaning process.

It is also to be remembered that effective reduction takes place within a very narrow range of temperatures. For example, active reduction of iron ore such as hematite, begins at a temperature of about 1650° F. but at 1700° F. the ore begins to stick together. Actually, variations in atmospheric pressure are often sufficient to cause a variation in temperature of the furnace which results in complete blocking of the furnace due to the adherence and coherence of the ore. Prior forms of apparatus and prior methods do not provide means whereby the temperature, during reduction, could be controlled with sufficient accuracy to permit the process to be carried out in a continuous manner.

In general, therefore, this invention relates to a method whereby metallic ores, generally of the oxide type, may be continuously reduced in an effective, rapid and readily controllable manner.

An object of this invention is to disclose and provide means whereby metallic ores may be reduced continuously.

Another object is to disclose and provide an ore reduction furnace whereby ores may be continuously reduced and temperatures therein accurately controlled.

A further object of the invention is to disclose and provide a combination of elements and means whereby metallic ores may be reduced in a continuous manner with high heat economy.

A still further object of the invention is to disclose and provide a continuous process of reducing metallic ores by the use of gaseous reducing agents.

These and other objects, uses, advantages, adaptations and modifications of the invention will become apparent to those skilled in the art from the following detailed description of a preferred form of apparatus, reference being had to the following drawings for the purpose of facilitating understanding of the invention.

In the drawings:

Fig. 1 is a side elevation of one form of furnace embraced by this invention.

Fig. 2 is an enlarged vertical section of the upper portion of the furnace shown in Fig. 1.

Fig. 3 is an enlarged vertical section of the lower portion of the furnace shown in Fig. 1.

As shown in the drawings, the apparatus may comprise a frame 1 adapted to effectively support a substantially vertical cylindrical portion. The apparatus may be provided with a hopper 2 at its upper end, the cylindrical body portion including a section 3 followed by two or more heating zones, such as the zones 4, 5 and 6. The lower portion of the apparatus may be provided with a mixing and pre-cooling zone 7 discharging into a cooling chamber 8, the bottom of the cooling chamber being provided with a substantially gas-tight outlet valve 9. Any suitable means for introducing ore in the required state of division into the hopper 2 may be provided. For purposes of illustration, the drawings show a hopper 10 adapted to discharge into a drier 11 of the inclined cylindrical and rotary type, said drier discharging the dried ore through a conduit 12 into the hopper 2. The drying cylinder 11 may be provided with a burner 13. The side of the hopper 10 may be provided with a passageway 14 through which the gases of combustion and water vapors may be discharged.

It is to be understood that the ore supplied to the hopper 10 or to the hopper 2 may be crushed, screened and otherwise treated prior to reduction.

Extending axially into the reducing apparatus is a hollow tubular shaft 15 preferably formed in sections threadedly connected to each other. Said shaft may be suspended on suitable up-thrust bearings, indicated at 16. Means for rotating the shaft are provided, such means being in engagement with the upper end of the shaft as through the worm gear 17. The tubular shaft 15 may carry a scroll 18 having an outside diameter virtually equal to the interior diameter of the cylindrical sections. The scroll may be made in sections corresponding to the lengths of tubular shafting, thereby facilitating dismantling of the apparatus. The tubular shaft 15 may terminate at the bottom of the lowermost heating zone, such as the bottom of the zone 6. The bottom of this tubular shafting may then be provided with a spider carrying mixing means extending into the pre-cooling zone 7. In the drawings the mixing means are shown to include an axial shaft 19 provided with stirring arms 20, 21, and the like.

The various heating and cooling sections of the reducing apparatus may be removably held together as by means of the flanges 22, 23 and 24. Preferably the length of these sections 3 to 7 is substantially equivalent to the length of the sections of tubular shafting 15. The hopper 2 carried by the top of the apparatus may have gas passages surrounding the same in heat-exchange relationship thereto. In the drawings, the hopper 2 is shown as being double walled, the gas passages being indicated at 26. The lower portion of the hopper 2 may be provided with ports 27 communicating with the interior of the furnace with the gas passages 26. Gas outlet means 28 may communicate with the upper portion of the gas passages 26. Furthermore, the entire apparatus may be partially suspended from the frame 1 by means of lugs 29 carried by the hopper 2, a compression spring 30 bearing upwardly against such lugs, the bottom of the spring being supported by lugs 31 carried by the frame 1. Vertical expansion and contraction of the apparatus can therefore be accommodated by the spring suspension, and a large portion of the weight of the column supported by the springs 30 and frame 1.

Means are provided for introducing a reducing gas into the hollow shaft 15 as, for example, by means of a conduit 32 extending through a suitable packing gland carried by the top of the shaft 15. The conduit 32 may terminate at the level of the hopper or some part thereof. By introducing reducing gas in this manner, the bearings carried by the upper portion of the shaft 15 are cooled and the reducing gases are preheated by their downward passage through the shaft 15 from which they discharge at the lower end of the tubular shaft immediately above the mixing and pre-cooling zone 7. Upon discharging at this point, the gases move upwardly through the spiral passageway formed by the scroll 18. Since the top of the hopper 2 is substantially gas-tight (the only port therein being the conduit 12), these reducing gases are discharged through the ports 27 into the passageways 26, giving up their heat to the incoming ore and being cooled thereby. Any water vapors condensing in the passageways 26 may be collected by a trap 33, the uncondensed gases being discharged by conduit 28.

The cooling chamber 8 may be rigidly connected to the frame 1 and is preferably provided with a conical bottom portion indicated at 34, said conical bottom portion being surrounded by a jacket 35 through which water or other cooling medium is circulated as by means of an inlet 36 and an outlet 37. The cooling chamber 8 may discharge into the valve mechanism 9 which may be of the rotary valve type including a hollow cylindrical portion 38 rotatably carried by a shaft 39 (such shaft being provided with suitable driving means, not shown), said cylindrical portion 38 being rotatably mounted within a stationary outer cylindrical housing 40 provided with a discharge port 41 and an inlet port 42 in communication with the bottom of the cooling chamber 8. The interiorly positioned cylindrical portion 38 is provided with one port 43 which may be brought into alignment with either the inlet port 42 or the discharge port 41, thereby permitting periodical discharge from the cooling chamber 8 without permitting the escape of gases from such cooling chamber.

The entire apparatus, including the cooling chamber 8, may be positioned immediately above a suitable conveyor or an ore car, as shown at 44.

Within the cooling chamber 8 and immediately below the cylindrical mixing and pre-cooling zone 7 of the furnace a conical member 45 is adjustably positioned on studs 46 whereby the degree to which the cone 45 extends into the zone 7 may be regulated. The ore discharged from the zone 7 can therefore be made to extend over the cone and fall into the bottom of the cooling chamber 8, the rate of discharge being regulated by the position of the cone 45. Means are also provided for introducing reducing gas into the cooling chamber 8 as, for example, by means of the conduit means 47. Such conduit means may discharge immediately below the apex of the cone 45 whereby said cone may be cooled while the reducing gas is preheated. The cascade of ore distributed by the cone 45 is also cooled by transverse passage of the relatively cool gas therethrough, the gas moving downwardly along the interior of the cone 45 and then upwardly in countercurrent relation to the downward movement of the ore into the mixing chamber 7 and successive heating chambers 4, 5 and 6. It is to be remembered that ore is partly supported by as well as moved downwardly through the apparatus by the scroll 18.

In order to permit careful regulation of the temperatures attained within the furnace, and particularly within the heating sections or zones 4, 5 and 6, each of said sections is provided with electrical induction heating means. Such means may comprise suitable lengths of hollow tubing, indicated at 50, connected with a suitable source of high frequency current, cooling fluid such as water being passed through the center of the device.

Each of the heating sections 4, 5 and 6 is provided with a separate induction coil and means are provided for regulating each of said coils separately, such means not being shown in the drawings appended hereto. Thermocouples may be connected to the exterior surface of each of the tubes forming the body of each section so that accurate control of temperatures throughout the length of the apparatus may be attained. The upper preheating section 3 of the apparatus may be heavily insulated; the lower cooling and mixing section 7 may be uninsulated.

Reference has been made heretofore to the use of reducing gases. Hydrogen is eminently suited for use in the process of this invention although natural gas or gases of the methane series may also be employed. Carbon monoxide or mixtures of carbon monoxide and hydrogen and/or other hydrocarbon gases or of natural gas and carbon monoxide and/or hydrogen may also be employed. Obviously, when carbon-free metals are to be produced, hydrogen is the preferred reducing gas. Approximately two-thirds of the total quantity of hydrogen (or other reducing gas) introduced into the apparatus should be introduced through the lower conduit 47 and only about one-third through the upper conduit 32.

In actual practice of the invention, the ore is preferably crushed to a relatively uniform particle size, such crushing being ordinarily followed by a screening operation so that a relatively permeable body of crushed ore can be obtained. In the treatment of iron ore, for example, ore retained on a 20 mesh but passing a ¼ inch mesh was handled very effectively. Ore passes downwardly through the apparatus, being partially supported by the scroll. The discharge of ore from the cooling and mixing zone 7 of the apparatus is regulated by the width of the annular opening at the bottom, such opening being modified by raising or lowering the cone 45.

During passage of the ore through the apparatus, progressive reduction of the ore takes place. The induction coils surrounding the section 4 are adjusted so as to maintain a temperature in such section sufficient to promote active reduction of the ore but insufficient to cause adherence or coherence of the ore particles. In the event any particles adjoining the inner surfaces of tube section 4 become sticky, they are removed from such tube by the rotation of the scroll. The lower heating sections, such as 5 and 6, may operate at progressively increasing temperatures. As a matter of fact, the lower heating section 6 may operate at a temperature of around 1850° F. or 1900° F. (during the treatment of hematite ores) or well above a temperature at which active coherence or stickiness would ordinarily be exhibited. The process of this invention permits the use of these high temperatures in the lower sections of the reducing apparatus for the following reasons:

The exterior surfaces of ore particles are reduced in sections 3 and 4. Since the ore is maintained in a reducing atmosphere, there is no tendency for the surface to reoxidize. After the exterior surface has been reduced, it is possible to subject the material to a higher temperature, permitting reduction to take place at an accelerated rate within each particle without the danger of causing agglomeration or lumping.

Attention is also called to the fact that the cooling which takes place in the mixing chamber 7 and cooling chamber 8 takes place in a reducing atmosphere.

Reference has been made heretofore to the fact that a larger proportion of reducing gas is introduced through conduit 47 than through conduit 32. It has been found that at the upper end of section 4, at a temperature of about 1700° F., approximately $\frac{5}{12}$ of the total reducing gas used is employed in the reducing reaction and approximately $\frac{7}{12}$ of the total quantity of gas is necessary for the purpose of preventing reoxidation of the particles. Oxidation of the particles may occur due to the presence of water vapor within the apparatus, such water vapor being derived from the generation of water by the reducing action of the gas or from water previously mechanically or chemically combined with ore constituents. At the temperatures employed and in the presence of metallic ingredients, this water vapor has a tendency to break down unless a surplus of reducing gas is provided. When higher temperatures are employed, a relatively larger proportion of gas is required for the purpose of preventing such oxidation, than is required at lower temperatures. By introducing most of the reducing gas through the conduit 47, the lower and hottest sections of the apparatus contain the largest excess proportions of reducing gas.

The total quantity of reducing gas in available form present in section 5 may be less than that in section 6 but section 5 is maintained at a lower temperature than section 6 and as large an excess of gas for the purpose of preventing oxidation is not required in section 5.

The reducing gas discharged from the upper portion of the apparatus as through conduits 28 may be sent through suitable containers for the removal of water vapor therefrom and other constituents and recompressed, rendering such gas available for reuse in cyclic operation of the process. It is highly desirable that the ore discharged from the apparatus be cooled to a temperature of about 300° F. or therebelow in order to prevent reoxidation. This precaution should be particularly taken in the event a substantially carbon-free metal is eventually desired. The reduced ore produced by the method and apparatus of this invention may be smelted in any desired form of equipment, induction types of furnaces having been found eminently suited in the production of substantially carbon-free metals which have remarkably high ductility and other highly desirable characteristics.

In view of the high temperatures maintained within the lower portions of the reducing apparatus, exposed outer metallic surfaces may have a tendency to oxidize. Such surface oxidation of the equipment may be prevented by enclosing the same in a substantially gas-tight housing and supplying the place between such housing and the exterior surfaces of the apparatus with an inert gas such as nitrogen or the like.

In a reducing apparatus made as described hereinabove, having an internal diameter of 19.5 inches and a height of approximately 40 feet, ore can be continuously and successfully reduced at the rate of about 20 to 30 tons per 24 hours, the time of residence of the ore within the apparatus ranging from about 3 to 5 hours.

I claim:

1. A reduction apparatus for metallic ores comprising: a substantially vertical body portion including pre-heating and heating sections, said body portion being provided with a hollow smooth-walled substantially vertical bore, induction heating coils carried by the heating section, a sealed cooling chamber below said body portion and in communication with the lower end of said bore, rotatable means in said bore and extending through said pre-heating and heating sections for supportingly conveying ore downwardly through said body portion; means positioned in the cooling chamber for regulating and dispersing ore discharged from the body portion into said cooling chamber, a port in said cooling chamber, and means for supplying gas for reduction through said port into the cooling chamber.

2. A reduction apparatus for metallic ores comprising: a substantially vertical body portion including pre-heating and heating sections, said body portion being provided with a hollow smooth-walled substantially vertical bore, induction heating coils carried by the heating section, a sealed cooling chamber below said body portion and in communication with the lower end of said bore, rotatable means in said bore and extending through said pre-heating and heating sections for supportingly conveying ore downwardly through said body portion; means positioned in the cooling chamber for regulating and dispersing ore discharged from the body portion into said cooling chamber, a port in said cooling chamber, means for supplying gas for reduction through said port into the cooling chamber, a gas-tight outlet valve at the bottom of said cooling chamber, means for supplying ore to the top of said bore, and port means in the upper portion of said body portion and in communication with said bore for discharging gases from said bore.

3. An apparatus for reduction of ores containing metallic oxides comprising: a substantially vertical body portion including preheating and heating sections provided with a hollow smooth-walled bore; induction heating coils carried by the heating sections of said body portion; a substantially gas-tight cooling chamber below said body portion and in communication with the lower end of said bore; means for feeding ore into the upper end of said bore; means for supporting and conveying ore downwardly through said bore, said means including a hollow shaft extending axially through said bore, and a scroll means carried by said shaft, a port in said shaft in the lower portion of said bore, means for supplying gas for reduction into the upper end of said shaft; means positioned in the cooling chamber for regulating and dispersing ore discharged from the bore into said cooling chamber, a port in said cooling chamber, and means for supplying gas for reduction through said port into said cooling chamber.

4. In an apparatus for the reduction of ores containing metallic oxides, the combination of: a stationary frame; a virtually gas-tight cooling chamber carried by the lower portion of said frame; a substantially vertical body portion including pre-heating and heating sections provided with a hollow smooth-walled vertical bore, the lower end of said body portion being attached to the cooling chamber with said bore in communication therewith; means connecting the upper portion of the body portion and said frame for yieldingly supporting said body portion; a feeding hopper carried by the top of said body portion and in communication with said bore; induction heating coils carried by the heating section of said body portion; rotatable means positioned in said bore and extending from above said body portion through said pre-heating and heating sections thereof for supportingly conveying ore downwardly through said body portion; a port in said cooling chamber, and means for supplying gas for reduction through said port into the cooling chamber.

5. In an apparatus of the character described in claim 4, a hollow-walled feeding hopper, ports in the inner wall of said hopper and in communication with the bore of said body portion, and a discharge port in the outer wall of said feeding hopper for discharging gases therefrom.

6. An apparatus of the character described in claim 4 including, as rotatable means in said bore for supportingly conveying ore downwardly, the provision of a hollow shaft provided with a scroll, a port in said shaft at a point above said cooling chamber but below the heating section of said body portion, and means for introducing gases for reduction into the upper end of said shaft.

WALTER GORDON CLARK.